(12) United States Patent
Amidi

(10) Patent No.: US 10,607,018 B2
(45) Date of Patent: Mar. 31, 2020

(54) APPARATUS, SYSTEM, AND METHOD OF SECURITIZATION OF MEMORY MODULES AGAINST MALICIOUS ACTS

(71) Applicant: Xitore, Inc., Mission Viejo, CA (US)

(72) Inventor: Mike Hossein Amidi, Lake Forest, CA (US)

(73) Assignee: Xitore, Inc., Lake Forest, CA (US)

(*) Notice: Subject to any disclaimer, the term of this patent is extended or adjusted under 35 U.S.C. 154(b) by 214 days.

(21) Appl. No.: 15/730,621

(22) Filed: Oct. 11, 2017

(65) Prior Publication Data

US 2018/0101685 A1 Apr. 12, 2018

Related U.S. Application Data

(60) Provisional application No. 62/406,850, filed on Oct. 11, 2016.

(51) Int. Cl.
*G06F 21/60* (2013.01)
*G06F 21/79* (2013.01)
*H04L 9/08* (2006.01)
*G06F 21/85* (2013.01)

(52) U.S. Cl.
CPC ............ *G06F 21/602* (2013.01); *G06F 21/79* (2013.01); *G06F 21/85* (2013.01); *H04L 9/0861* (2013.01)

(58) Field of Classification Search
CPC ........ G06F 21/602; G06F 21/79; G06F 21/85; H04L 9/0861
See application file for complete search history.

(56) References Cited

U.S. PATENT DOCUMENTS

| | | |
|---|---|---|
| 5,134,700 A | 7/1992 | Eyer et al. |
| 8,255,620 B2 | 8/2012 | Frost et al. |
| 8,959,311 B2 | 2/2015 | Akkar et al. |
| 9,501,652 B2 | 11/2016 | Paksoy et al. |
| 2006/0120002 A1* | 6/2006 | Asada ................ H03K 17/0822 361/103 |
| 2007/0286420 A1* | 12/2007 | MacLean ............... H04N 7/162 380/201 |
| 2012/0093318 A1* | 4/2012 | Obukhov ............ G06F 21/6209 380/277 |
| 2012/0254637 A1* | 10/2012 | Yasaki ...................... G06F 1/26 713/300 |
| 2015/0288527 A1* | 10/2015 | Vanstone .............. H04L 9/3268 713/156 |

* cited by examiner

*Primary Examiner* — Ayoub Alata
(74) *Attorney, Agent, or Firm* — Fish IP Law, LLP

(57) ABSTRACT

A secure memory that couples to a host memory controller via a host memory interface remains secure by permanently altering a security key when a hardware interrupt detector detects that a signal between the host memory interface hardware and the host memory controller hardware is interrupted. Such an interruption could be, for example, a blackout, a brownout, or a person decoupling any portion of the host memory interface, even pins that are normally unused by a standard memory module, such as a DRAM, MRAM, or SSD module.

19 Claims, 3 Drawing Sheets

APPARATUS, SYSTEM, AND METHOD OF SECURITIZATION OF MEMORY MODULES AGAINST MALICIOUS ACTS

This application claims the benefit of priority to U.S. provisional application 62/406,850 filed on Oct. 11, 2016. This and all other extrinsic references referenced herein are incorporated by reference in their entirety.

FIELD OF THE INVENTION

The field of the invention is secure memory systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Securing sensitive electronic data is of extreme importance, particularly where the electronic data provides access to high-value assets. Securing data in a computer's volatile memory modules is of particular importance since data saved on volatile memory modules is typically unencrypted for rapid access by a user system. A malicious actor could rapidly pull out a memory module from a computer that is in-use and plug that memory module into a new computer, to gain access to the unencrypted data on the memory module.

U.S. Pat. No. 5,134,700 to Eyer teaches a microcomputer with an internal RAM that has secure data that can only be accessed by internal programs. When the microcomputer is in external program mode, Eyer's system cuts off access to the secure internal RAM. Given time, however, malicious actors could replace Eyer's mode control with their own control switch, giving external programs access to Eyer's secure internal RAM.

U.S. Pat. No. 8,959,311 to Akkar teaches a RAM having both public and secure partitions. A cryptographic hardware accelerator coupled to Akkar's processor is used to control access to the secure partition. However, a malicious actor could simply physically steal Akkar's cryptographic hardware accelerator in addition to Akkar's RAM to gain access to the data stored on the RAM, which would nullify any security measures taken to secure data saved on Akkar's RAM.

U.S. Pat. No. 9,501,652 to Paksoy teaches a system that has a plurality of processors, with a more secure processor and storage for high-security applications and a less-secure processor and storage for low-security applications. Paksoy's secure storage, however, can also be accessed by a malicious actor who physically steals Paksoy's high-security processor in addition to its high-security storage.

Thus, there remains a need for a system and method to secure access to a computer-readable medium.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a secure memory apparatus permanently alters a security key used to access the memory when a signal between the host memory interface hardware and the host memory controller hardware is interrupted.

The secure memory apparatus could comprise any suitable computer-readable medium, such as DRAM, MRAM, and SSD, but is generally an array of volatile memories coupled to the host memory controller via a host memory interface. Contemplated host memory controllers include any host memory interface hardware port for a host memory computer system's control bus, for example a USB (Universal Serial Bus) port, a Peripheral Component Interconnect (PCI) port, and a PATA (Parallel AT Attachment) port, a SATA (Serial AT Attachment) port. The secure memory apparatus has a hardware interrupt detector that will permanently alter a security key of the secure memory apparatus when a signal between the host memory interface hardware and the host memory controller hardware is interrupted.

The hardware interrupt detector could be configured to monitor all hardware pins of the secure memory apparatus such that, if any of the pins of the secure memory apparatus are interrupted in an unnatural way any manner, the security key is permanently altered. In a preferred embodiment, the hardware interrupt detector monitors just one, two, three, or four key hardware pins to detect an interruption. In some embodiments, the hardware interrupt detector monitors the power supply pins (e.g. VCC and GND) pins of the secure memory apparatus, and if a signal from either pin is interrupted (e.g. via a brownout, a blackout, when the secure memory apparatus is physically removed from the host memory controller), the system will permanently alter the security key. In a preferred embodiment, the hardware interrupt detector monitors an edge pin (the pin all the way at either edge of the host memory interface) and if that edge pin is disconnected, the security key is permanently altered. The hardware interrupt detector could monitor standard pins that already exist for existing memory standards, for example the VCC for a standard MRAM or a VCC for a standard DRAM, or could use a non-standard pin for a circuit that is dedicated to only the hardware interrupt detector to permanently alter the security key.

The security key could be permanently altered in a variety of ways. In some embodiments, the security key could be reset every time the hardware interrupt detector sends a signal, for example by shuffling through a random number generator or a security key generator or by sending an initialize command to a module that will reinitialize the security key when a signal monitored by the hardware interrupt detector is restored. In other embodiments, an input to the security key could be permanently incremented, which is saved to a non-volatile computer-readable medium. Since the input can be quite small (e.g. 16-bit or 32-bit), the non-volatile computer-readable medium can have a small hardware imprint of the secure memory apparatus.

The security key could be generated in any suitable manner, for example by combining a private key and a public key together. Contemplated private keys are generally culled from the secure memory apparatus itself and can never be accessed by an outside module, for example an internal serial number or an output of a local random number generator and/or a combination thereof. Public keys are generally culled from the host system itself and is received by the secure memory apparatus via the host memory controller, generally via a storage device driver programmed to transmit the public key to the secure memory apparatus. Contemplated public keys include, for example, a serial number of a hardware component (e.g. a processor, a network card) of the host computer system, or a serial number of a software component of the host computer system (e.g. an operating system, an application) and/or the combination thereof. Any number of public keys and/or private keys could be used to generate the security key.

Any suitable algorithm could be used to generate the security key from the private key and the public key. In the simplest embodiment, the security key could be generated using a simple logical AND module, for example an AND hardware gate or an AND programmatic software function. In a simple embodiment, the hardware interrupt detector could merely deactivate the AND logical module, which could not then be reactivated until an initialization signal is sent from the host memory controller, which would necessarily generate a new security key.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
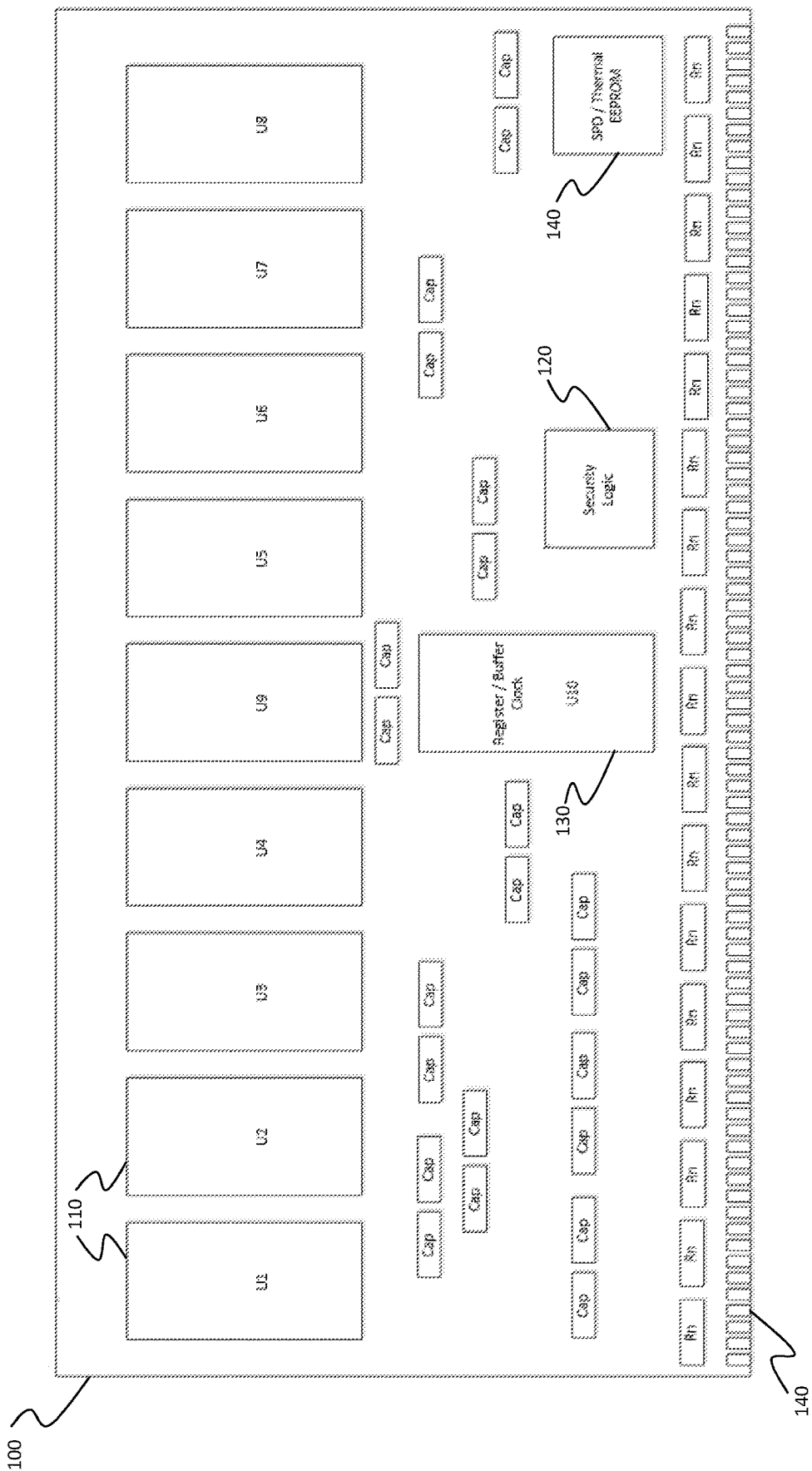
FIG. 1 shows an exemplary secure memory apparatus.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

One should appreciate that the disclosed techniques provide many advantageous technical effects including providing on-device security for any computer-readable medium that can be completely transparent to a computer system and secure the memory from any foreign actor who wishes to physically remove the memory from the computer system.

The inventive subject matter provides apparatus, systems, and methods in which a secure memory deactivates a security key used in real-time to encrypt/decrypt data on a computer-readable medium.

In FIG. 1, a security memory apparatus 100 is a memory board comprising computer-readable medium 110 (labeled U1-U8), a security logic block 120, a combination of input buffer and a clock 130, and a host memory interface 140. While the computer-readable medium 110 is shown as an array of DRAM memory, computer-readable medium 110 could be any volatile or non-volatile memory, such as SRAM, SDRAM, DDR, MRAM, Flash, PCM, 3D-Xpoint, ReRAM memory, or SSD. Security logic block 120 acts as a gateway through which data from host memory interface 140 is written, read, and overwritten. Security logic block 120 generates a security key that dynamically encrypts data that is written to computer-readable medium 110, and decrypts data that is read from computer-readable medium 110. Buffer and Clock 130 acts as a buffer and/or register device to separate host memory interface incoming address, command, and control bus loading from the host system 100, and can also pass through provide public key from device driver to security logic 120. EEPROM 140 saves memory module configuration that requires for BIOS and OS to detect type of product plugged into the host memory interface socket apparatus 100.

Host memory interface 140 is shown as a plurality of parallel pins that provide a communication medium through which data from security memory apparatus 110 could be transmitted. Security logic 120 has a hardware interrupt detector (not shown) that monitors one or more pins of host memory interface 140 to detect whether a pin has been disconnected. In a preferred embodiment, security logic 120 monitors at least one, if not both edge pins (the pin on the far left and the pin on the far right) of host memory interface 140, as those pins tend to be disconnected first, and would indicate immediately whether a malicious actor has removed security memory apparatus 100 from a host computer system. In such an embodiment, the host computer system will likely need to have a custom driver that will shuffle pin functionality accordingly to ensure that one or more edge pins are dedicated only towards the hardware interrupt detector, and when a circuit using either edge pin is broken, the hardware detector will detect that security memory apparatus 100 has been removed. Preferably, the hardware interrupt detector acts as a member of a physical or logical serial circuit between the two edge pins, so that if the connection of either edge pin is removed, a switch in the hardware interrupt detector will be permanently flagged until security logic 120 is reinitialized.

Figure 2:
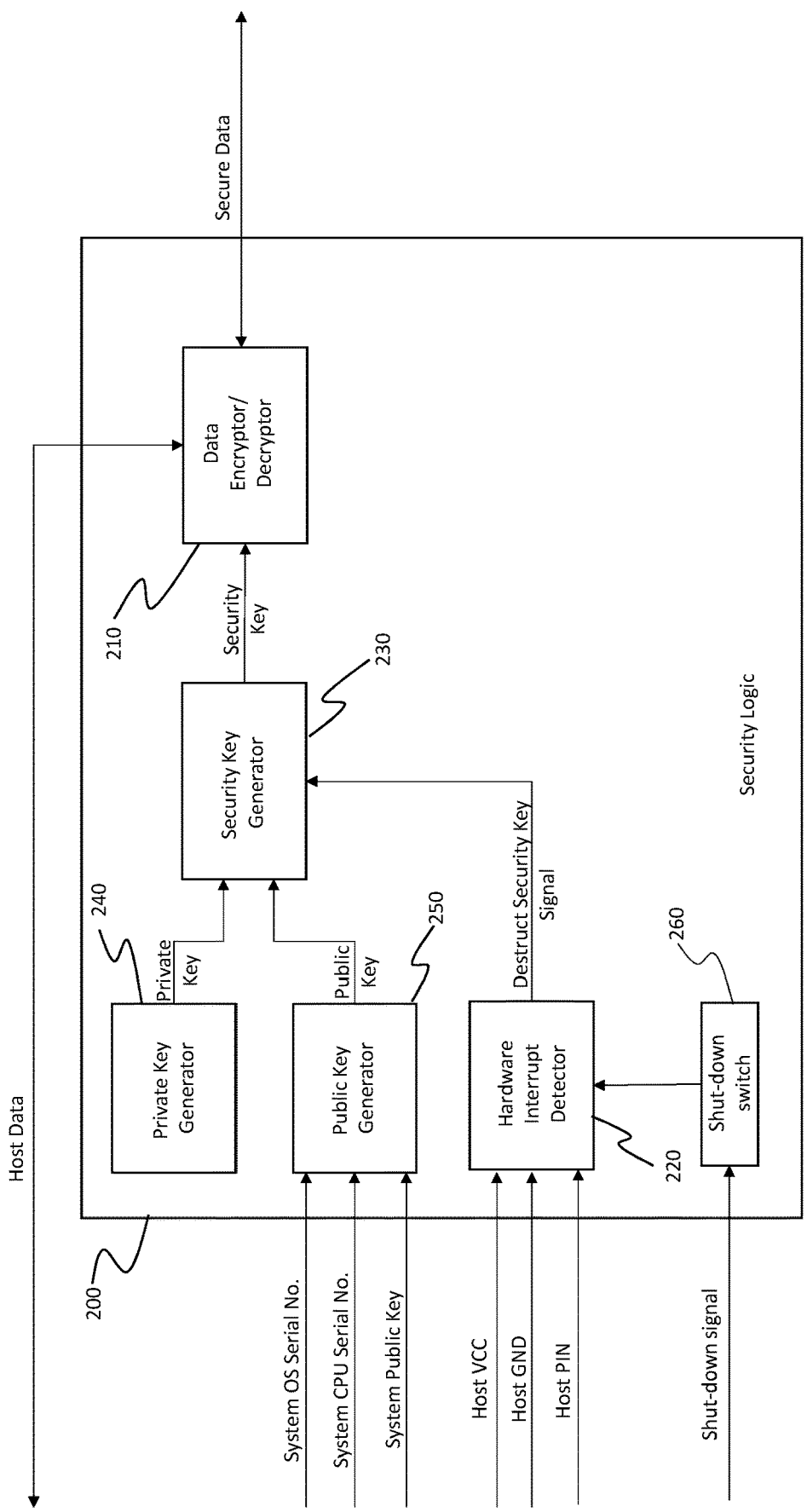
FIG. 2 is a schematic of components of a security logic block of a secure memory apparatus.

In FIG. 2, a logical schematic of a security logic module 200 is shown, where unencrypted host data is transmitted to the computer-readable medium via data encryptor/decryptor 210, which encrypts/decrypts data using a generated security key dynamically. Preferably, the security key is dynamically fed to data encryptor/decryptor 210 and is not saved anywhere within security logic module 200, such that any change to the inputs to security key generator 230 will result in an alteration of the security key. Data encryptor/decryptor 210 could encrypt data and decrypt data using the security key in any suitable manner, such as using a symmetric-key algorithm.

Security key generator 230 is a logical module that dynamically generates a security key for data encryptor/decryptor 210. In a simple embodiment, security key generator 230 could have functional AND logic that adds a private key and a public key together to generate the security key. The security key generator 230 could even be an AND gate itself, which is deactivated by the destruct security key signal and only comes online after security key generator 230 receives a re-initialization signal. In an even simpler embodiment, security key generator 230 could be a volatile memory that holds a random number, possibly generated using an on-board clock or register such as clock 130 as a seed input, and every time the security key generator 230 receives a "destruct security key" signal from hardware interrupt detector 220, security key generator 230 could re-initialize a new security key or could add the current clock time to the old security key to generate a new security key. Security key generator 230 could be programmed to reinitialize the security key immediately upon receiving the destruct security key sequence, or could be programmed to shut down until the entire security key generator 230 receives an initialization command.

Hardware interrupt detector 220 monitors one or more signals between the host memory interface of the security memory apparatus and the host memory controller. Any of the signals monitored by hardware interrupt detector 220 is interrupted in any way, hardware interrupt detector will send a destruct security key signal to security key generator 230 to destroy the current security key. Here, hardware interrupt detector 220 is monitoring three signals from the host memory interface, the host VCC, the host GND, and another pin of the host memory interface. However less or more signals between the host memory interface and the host memory controller could be monitored. Preferably, hardware interrupt detector 220 is programmed to only monitor static signals, as dynamic signals (e.g. a data bus) are not as useful to monitor as static signals.

Private key generator 240 generates a private key that is fed to security key generator 230 to generate a security key. Private key generator 240 could generate a private key in any suitable manner, for example by providing a static key (e.g. a serial number associated with the security memory module) or a dynamic key (e.g. an output of a programmatic random number generator that is then saved onto a volatile or a non-volatile memory as the private key). Public key generator 250 accepts any number of inputs from the host memory interface to generate the public key. In some embodiments, a security logic need not receive any public key seeds from the host memory interface, and only monitors signals using hardware interrupt detector 220. In preferred embodiments, public key generator 250 dynamically receives public key information from the host memory controller, generally via a driver installed on the host computer system. Here, a system OS serial number, a system CPU serial number, and a system provided public key are used as inputs to generate the public key, but more or less public key information could be received by the host memory interface to seed the public key generated.

By utilizing a public key that is directly tied to static computer system information, the public key generated will inherently monitor changes in the computer system, which might also indicate a malicious actor. For example, if a malicious actor loads their own operating system onto the host computer system, the public key will change, or if a malicious actor spoofs a different IP address for the host system (and the IP address is normally static and is used as a seed for the public key generator), the public key will change. In some embodiments, security key generator 230 could treat the public key as a destruct security key signal if the public key is altered in any manner, causing security key generator 230 to reinitialize.

In some embodiments, secure memory module 200 could have a shut-down switch 260, that is utilized to instruct security key generator 230 to shut down gracefully and not permanently alter the security key. Including a shut-down switch 260 in some embodiments is useful where the computer-readable memory comprises a non-volatile memory, and the computer needs to be shut off. The shut down signal would come from a device driver of the host computer system, and would temporarily deactivate hardware interrupt detector 220 until shut-down switch 260 is reinitialized—typically at startup of the host computer system. Should the security memory apparatus be unplugged or should the host computer system lose power before a shut-down signal is sent to shut-down switch 260, whatever data is saved on the secure non-volatile memory would be lost forever, since the security key would be permanently altered when hardware interrupt detector 220 sends the destruct security key signal to security key generator 230.

It should be apparent to those skilled in the art that many more modifications besides those already described are possible without departing from the inventive concepts herein. Preferred embodiments for volatile secure memory apparatus do not include shut-down switch 260 or public key generator 250, to allow for a completely transparent secure memory module that will reinitialize whenever hardware interrupt detector 220 detects an interruption of a critical static signal. Preferred embodiments for non-volatile secure memory apparatus include both shut-down switch 260, public key generator 250, and a specialized device driver installed on the host operating system that requires maximum cooperation between the host memory system and the security logic module 200 to ensure that data on the non-volatile security memory apparatus is not lost forever.

Figure 3:
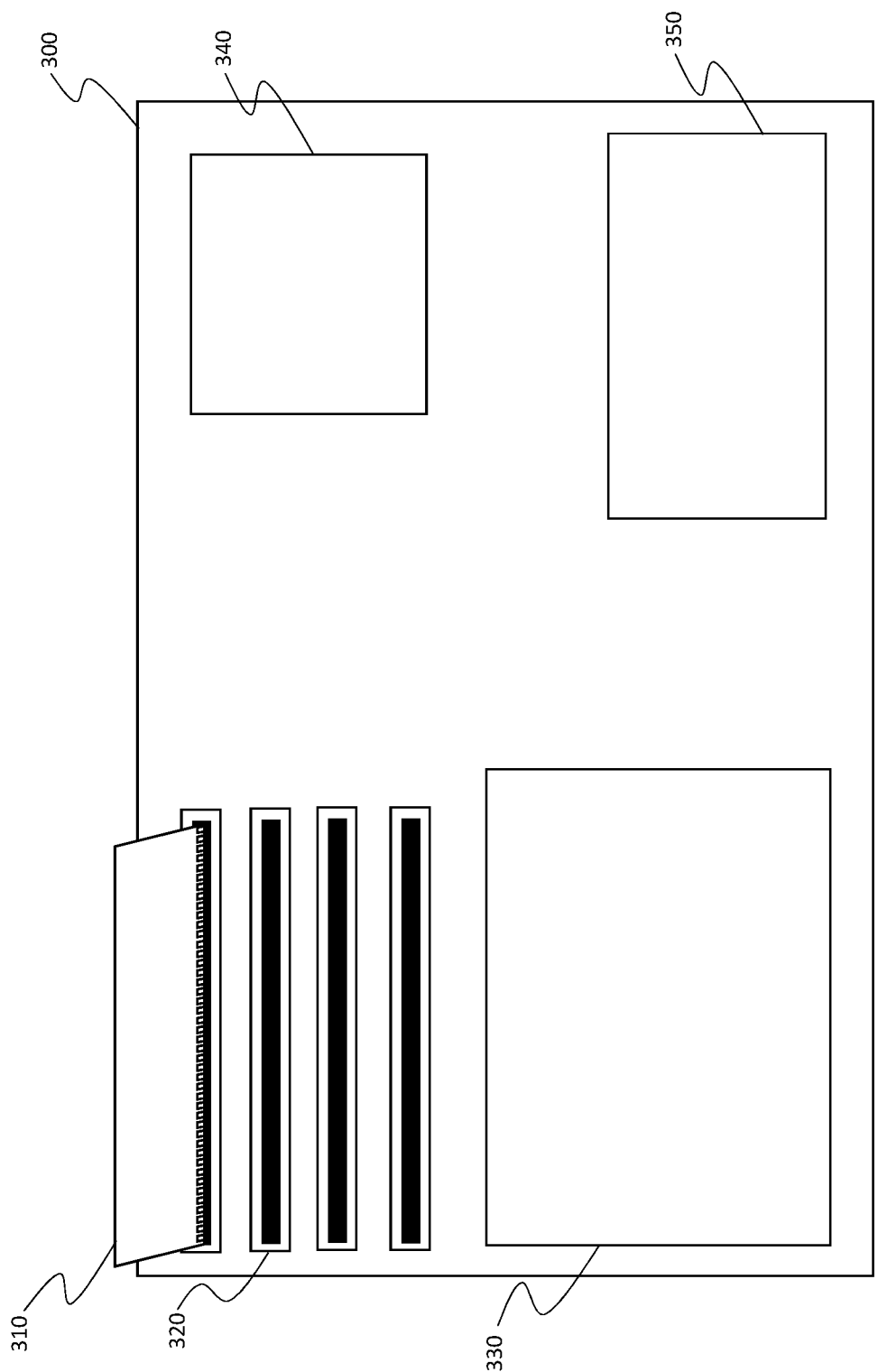
FIG. 3 shows an exemplary computer system using the secure memory apparatus.

FIG. 3 shows an exemplary computer system 300, shown here as a simple motherboard with a secure memory module 310 plugged into a host memory controller interface sockets 320, a host computer memory 330 (e.g. a hard drive), and a host CPU 340. While computer system 300 is shown here as a motherboard, any suitable computer system that provides a host memory controller that couples with a host memory interface of a secure memory module could be utilized. Host computer memory 330 generally stores an operating system and applications that are executed by host CPU 340, and which transfer data to/from secure memory module 310. Preferably, host computer memory 330 also stores a device driver that helps to communicate memory-specific commands to secure memory module 310, such as public key seed information, or a shut-down switch.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A secure memory apparatus, comprising:
   a computer-readable medium;
   a processor;
   a host memory interface configured to be coupled to a host memory controller;
   a security key generator executed by the processor, the security key generator programmed to generate a security key to encrypt data saved to the computer-readable medium and decrypt data retrieved from the computer-readable medium;
   a hardware interrupt detector executed by the processor, the hardware interrupt detector programmed to permanently alter the security key when a signal between the host memory interface hardware and the host memory controller hardware is interrupted, and storing the security key in the computer-readable medium after the security key has been permanently altered;
   wherein the security key generator comprises:
      a private key generator that generates a private key;
      a public key generator that generates a public key;
      a key merger circuit that generates the security key as a function of the private key and the public key; and
   a host computer system comprising:
      a storage device driver programmed to transmit a unique identifier of the host computer system to the public key generator to generate the public key.

2. The secure memory apparatus of claim 1, wherein the memory comprises an array of parallel volatile memories.

3. The secure memory apparatus of claim 1, wherein the memory comprises at least one of DRAM, SRAM, DDR, and MRAM.

4. The secure memory apparatus of claim 1, wherein the memory comprises at least one of Flash, PCM, ReRAM, 3D Xpoint, SSD, and MRAM.

5. The secure memory apparatus of claim 1, wherein the host memory interface comprises a parallel memory interface.

6. The secure memory apparatus of claim 1, wherein the hardware interrupt detector detects an edge pin decoupling from the host memory controller.

7. The secure memory apparatus of claim 1, wherein the edge pin is dedicated to only a hardware interrupt detector hardware circuit.

8. The secure memory apparatus of claim 1, wherein the hardware interrupt detector detects a power pin decoupling from the host memory controller.

9. The secure memory apparatus of claim 8, wherein the power pin comprises at least one of a VDD pin and a GND pin.

10. The secure memory apparatus of claim 1, wherein the key merger circuit comprises an AND logical module.

11. The secure memory apparatus of claim 10, wherein the hardware interrupt detector deactivates at least a portion of the AND logical module.

12. The secure memory apparatus of claim 1, wherein the private key generator executed by the processor is programmed to generate the private key as a function of a serial number of the secure memory apparatus.

13. A secure memory system, comprising:
   a computer-readable medium;
   a host memory interface coupled to a host memory controller;
   a security key generator that generates a security key to encrypt data saved to the computer-readable medium and decrypt data retrieved from the computer-readable medium;
   wherein the security key generator comprises:
      a private key generator that generates a private key;
      a public key generator that generates a public key;
      a key merger circuit that generates the security key as a function of the private key and the public key; and
   a hardware interrupt detector that permanently alters the security key when a signal between the host memory interface hardware and the host memory controller hardware is interrupted, and storing the security key in the computer-readable medium after the security key has been permanently altered;
   a host computer system comprising:

a storage device driver programmed to transmit a unique identifier of the host computer system to the public key generator to generate the public key.

14. The secure memory system of claim 13, wherein the unique identifier comprises a serial number of a processor of the host computer system.

15. The secure memory system of claim 13, wherein the unique identifier comprises a serial number of an operating system of the host computer system.

16. A method of securing a memory system, comprising:
communicating data with a host system via a host memory interface coupled with a host memory controller;
generating a private key;
transmitting a unique identifier of the host system to generate a public key;
generating the security key as a function of the private key and the public key;
wherein the security key encrypts data from the host memory controller saved to a computer-readable medium and decrypts data retrieved from the computer-readable medium to transmit to the host memory controller;
permanently altering the security key when a portion of the host memory interface is decoupled from the host memory controller; and
storing the security key in the computer-readable medium after the security key has been permanently altered.

17. The method of claim 16, further comprising detecting when the portion of the host memory interface is decoupled from the host memory controller by tracking a closed circuit using an edge pin of the host memory interface.

18. The method of claim 16, further comprising detecting when the portion of the host memory interface is decoupled from the host memory controller by tracking a VDD power input to the host memory interface.

19. The method of claim 16, wherein permanently altering the security key comprises permanently altering a private key of the security key.

* * * * *

UNITED STATES PATENT AND TRADEMARK OFFICE
CERTIFICATE OF CORRECTION

PATENT NO. : 10,607,018 B2
APPLICATION NO. : 15/730621
DATED : March 31, 2020
INVENTOR(S) : Mike Hossein Amidi and William Michael Gervasi It is certified that error appears in the above-identified patent and that said Letters Patent is hereby corrected as shown below:

On the Title Page

Item (12), delete "Amidi" and insert -- Amidi et al. --

Item (72), "Inventor: Mike Hossein Amidi, Lake Forest, CA (US)" should be -- Inventor: Mike Hossein Amidi, Lake Forest, CA (US); William Michael Gervasi, Ladera Ranch, CA (US) --

Signed and Sealed this
Twenty-fourth Day of January, 2023

Katherine Kelly Vidal
*Director of the United States Patent and Trademark Office*